(12) United States Patent
Shimoda et al.

(10) Patent No.: US 7,079,776 B1
(45) Date of Patent: Jul. 18, 2006

(54) OPTICAL SIGNAL TRANSMISSION BOARD AND APPARATUS

(75) Inventors: Tatsuya Shimoda, Suwa-gun (JP); Satoshi Inoue, Chino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/700,915

(22) PCT Filed: Mar. 23, 2000

(86) PCT No.: PCT/JP00/01787
§ 371 (c)(1),
(2), (4) Date: Nov. 22, 2000

(87) PCT Pub. No.: WO00/57489
PCT Pub. Date: Sep. 28, 2000

(30) Foreign Application Priority Data
Mar. 23, 1999 (JP) .................................. 11/077753

(51) Int. Cl.
*H01L 29/26* (2006.01)
(52) U.S. Cl. ...................... 398/140; 398/135; 398/182; 398/201; 398/202; 257/79; 257/80; 257/81; 257/82
(58) Field of Classification Search ........ 398/115–117, 398/140, 135, 138, 183, 202, 201, 207, 182; 257/79–88
See application file for complete search history.

(56) References Cited

U.S. PATENT DOCUMENTS

| | | | | |
|---|---|---|---|---|
| 4,533,833 A | * | 8/1985 | Copeland et al. ........... 250/551 |
| 5,047,623 A | * | 9/1991 | Wilcox ..................... 250/214.1 |
| 5,200,631 A | * | 4/1993 | Austin et al. ................ 257/570 |
| 5,266,794 A | * | 11/1993 | Olbright et al. ....... 250/214 LS |
| 5,535,101 A | * | 7/1996 | Miles et al. ................. 361/808 |
| 5,729,038 A | * | 3/1998 | Young et al. ................ 257/460 |
| 5,796,714 A | * | 8/1998 | Chino et al. .................. 372/50 |
| 5,869,896 A | * | 2/1999 | Baker et al. ................ 257/724 |
| 6,114,737 A | * | 9/2000 | Tonai .......................... 257/434 |
| 6,366,375 B1 | * | 4/2002 | Sakai et al. ................... 398/43 |

FOREIGN PATENT DOCUMENTS

| | | |
|---|---|---|
| EP | 526886 A | 2/1993 |
| JP | A-2-56973 | 2/1990 |
| JP | A-3-178230 | 8/1991 |
| JP | A-5-37357 | 2/1993 |
| JP | A-9-246509 | 9/1997 |

* cited by examiner

*Primary Examiner*—David C. Payne
(74) *Attorney, Agent, or Firm*—Oliff & Berridge, PLC

(57) ABSTRACT

An individual optical signal transmission substrate includes an optical signal transmission area where at least one of a light emitting element for sending an optical signal to other optical signal transmission substrates or a light receiving element for receiving an optical signal from other optical signal transmission substrates is located so as to be capable of sending or receiving the optical signal in a direction substantially perpendicular to the surface of the substrate. When a plurality of such substrates are laminated one over another, the light receiving element is located in any one of the optical signal transmission substrates so as to be opposed to the light emitting element provided in any one of the other optical signal transmission substrates, thereby composing an optical signal transmission devices.

6 Claims, 9 Drawing Sheets

OPTICAL SIGNAL TRANSMISSION
SUBSTRATE OF EXAMPLE

FIG.9

OPTICAL SIGNAL TRANSMISSION BOARD AND APPARATUS

BACKGROUND OF THE INVENTION

1. Field of the Invention

The present invention relates to an optical signal transmission substrate which uses optical signals as input and output information. More particularly, this invention relates to a substrate appropriate for high-density packaging of, for example, electronic computers, and also relates to an optical signal transmission device which utilizes such substrate.

2. Description of the Related Art

Regarding conventional devices such as electronic computers, a plurality of substrates necessary to compose circuits are mutually connected through electrical wiring by using conductive lines such as cables or wires. Signals sent and received between the substrates are electric signals which generate interface elements.

With some devices, such optical signal transmission is realized as a light emitting element is provided on one substrate and a light receiving element is provided on the other substrate, thereby connecting both elements with optical fibers.

Since the connection using conductive lines causes a signal delay due to the existence of the capacity for wiring and the wiring resistance, it is not suited for the wiring between substrates of high-speed and high-density packaging devices. There is another inconvenience of generating heat due to the wiring resistance.

On the other hand, the connection utilizing optical fibers requires a large number of optical fibers for multiple wiring such as buses and also requires enormous man-hours for the wiring work, and the increase in costs required for the wiring is inevitable.

SUMMARY OF THE INVENTION

In view of the above-described problems, it is an object of this invention to provide an optical signal transmission substrate and a device thereof which will eliminate the man-hours required for the wiring work and the costs for wiring, which are formed in high-density packaging, and which enable high-speed communication.

This invention provides an optical signal transmission substrate for transmitting an optical signal, comprising an optical signal transmission area where at least one of a light emitting element for sending the optical signal to other optical signal transmission substrates or a light receiving element for receiving the optical signal from other optical signal transmission substrates is located so as to be capable of sending or receiving the optical signal in a direction substantially perpendicular to the surface of the substrate.

When the optical signal transmission substrate is used as it is held between the other optical signal transmission substrates, desirably, the optical signal transmission area of the optical signal transmission substrate is structured to comprise a transmissible window exhibiting light transmittability at the position where the optical signal transmitted between the other optical signal transmission substrates passes through.

It is desirable that the optical signal transmission substrate comprise electrodes at least at a pair of the edges of the substrate.

This invention is an optical signal transmission device composed by laminating a plurality of optical signal transmission substrates as described above in such a manner that the optical signal transmission areas of the respective substrates overlap one another, wherein the light receiving element is located in any one of the optical signal transmission substrates so as to be opposed to the light emitting element provided in any one of the other optical signal transmission substrates.

With this optical signal transmission device, it is desirable that the optical signal transmission substrate held between the optical signal transmission substrate provided with the light emitting element and the optical signal transmission substrate provided with the light receiving element comprise a transmittable window exhibiting light transmittability at the position where the optical signal passes which is transmitted between the light emitting element and the light receiving element.

In order to enable high-density communication, it is desirable that plural sets of the light emitting element and the light receiving element for transmitting the optical signal be located along the optical axis of one optical signal.

In order to laminate the substrates, it is desirable that the optical signal transmission device comprise an adhesive layer between the optical signal transmission substrates, the adhesive layer composed of an adhesive agent and electrodes for electrically connecting the electrodes of both substrates.

BEST MODE FOR CARRYING OUT THE INVENTION

Embodiments of this invention are hereinafter explained by referring to the attached drawings.

(Embodiment 1)

Figure 1:
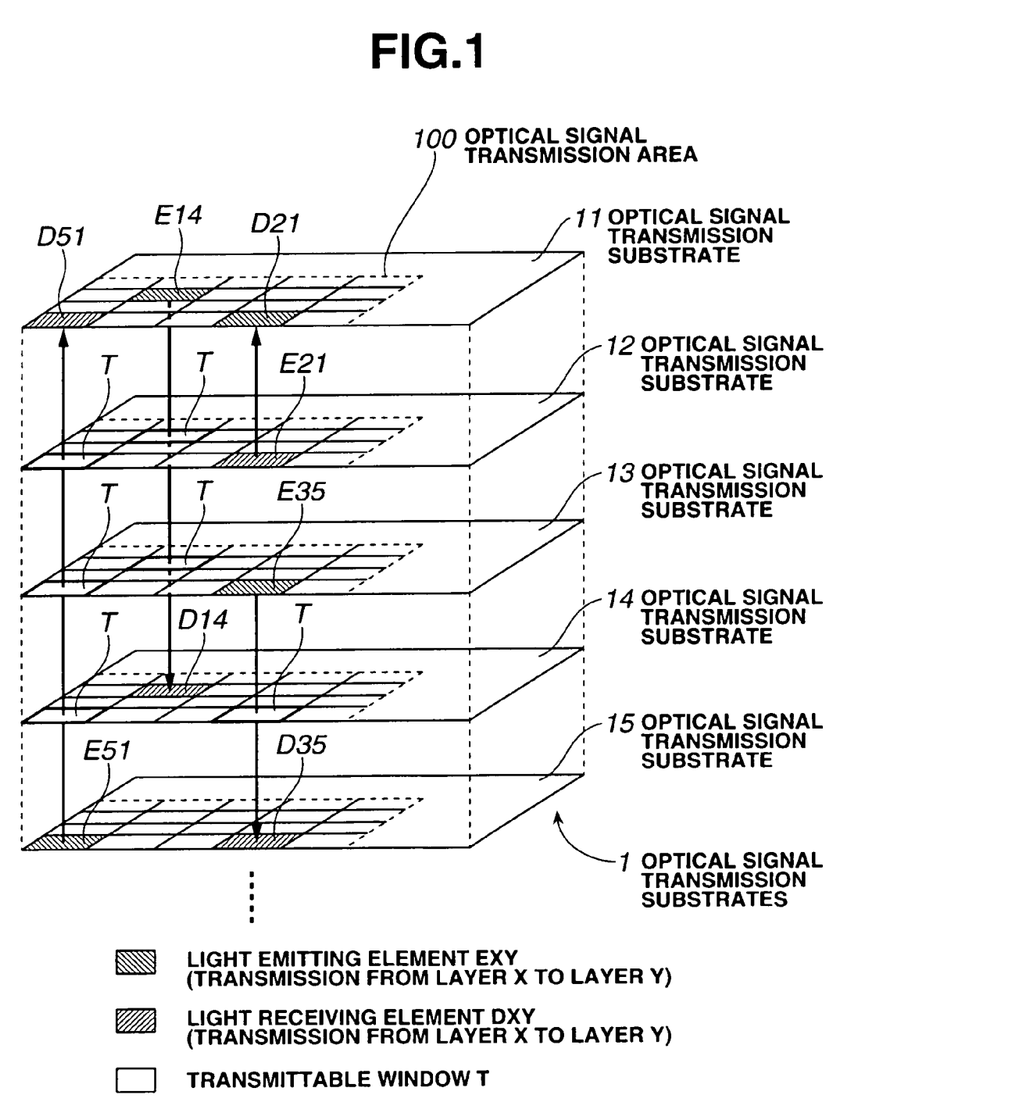
FIG. 1 is a perspective view illustrative of the construction of an optical signal transmission device according to Embodiment 1.
Figure 2:
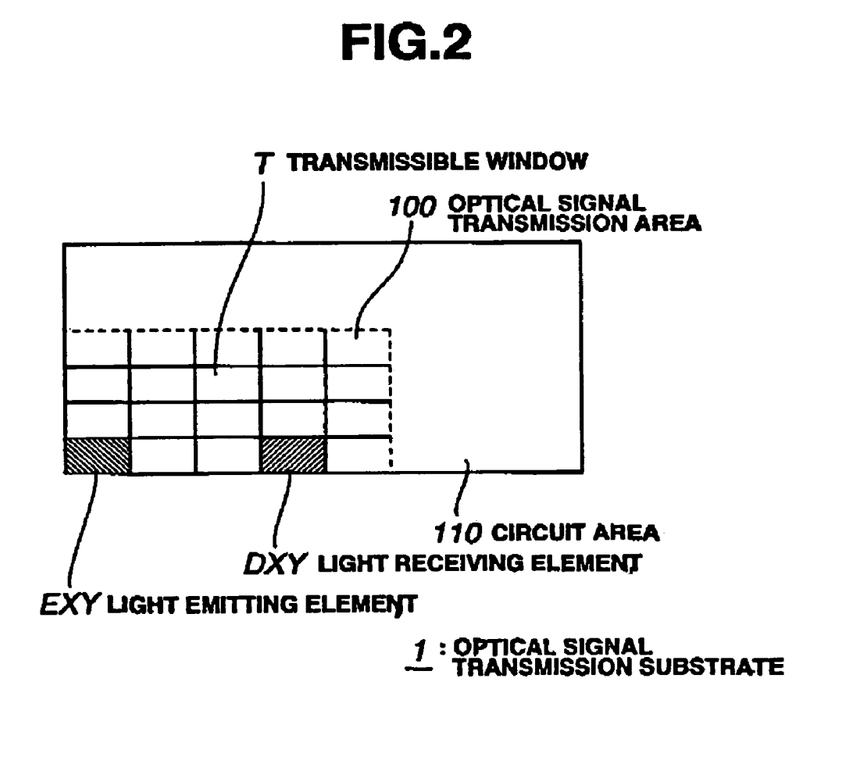
FIG. 2 is a plan view of an optical signal transmission substrate according to Embodiment 1.

FIG. 1 is a perspective view illustrative of the construction of an optical signal transmission device according to Embodiment 1. FIG. 2 is a plan view of an optical signal transmission substrate of the optical signal transmission device.

As shown in FIG. 1, the optical signal transmission device of this embodiment is composed by laminating a plurality of optical signal transmission substrates 1 in such a manner that optical signal transmission areas 100 of the respective substrates overlap one another. FIG. 1 shows the lamination structure of five layers in order to simplify the explanation, but there is no limitation to the number of layers. In FIG. 1, the respective optical signal transmission substrates 1 from a first layer to a fifth layer are given reference numerals 11 through 15. Any distance between the optical signal transmission substrates may be allowed as long as it is within the range that enables the transmission of optical signals between a light emitting element and a light receiving element. A plurality of substrates may be laminated by making them in direct contact with one another or by interposing spacers or adhesive layers between them.

In the respective optical signal transmission substrates 11 through 15, a light receiving element DXY of any one of the optical signal transmission substrates 1 is located at the position opposed to a light emitting element EXY provided in any one of the other optical signal transmission substrates, where "EXY" means that the relevant element is a light emitting element for transmitting optical signals from a substrate of layer X to a substrate of layer Y, and "DXY" means that the relevant element is a light receiving element for receiving optical signals transmitted from the substrate of layer X to the substrate of layer Y. A path for sending and receiving one optical signal by means of a combination of the light emitting element EXY and the light receiving element DXY is called a "channel." The light emitting element and the light receiving element which belong to the same channel are located in the same row and column in the optical signal transmission areas 100 of any substrates. The location in the optical signal transmission area as specified by row and column is hereinafter called an "address."

Specifically speaking, between the optical signal transmission substrate 1 with the light emitting element EXY provided thereat and the optical signal transmission substrate 1 with the light receiving element DXY provided thereat, the light emitting element EXY and the light receiving element DXY are located at opposed positions in such a manner that they can send and receiving optical signals. When another optical signal transmission substrate 1 is held between the substrate with the light emitting element and the substrate with the light receiving element, such an interposed optical signal transmission substrate 1 is structured to comprise a transmittable window T, which exhibits light transmittability, at the position where the optical signal passes which is transmitted between the light emitting element EXY and the light receiving element DXY of the other substrates. The transmittable window T is located at the same address in the optical signal transmission area 100 as that of the light emitting element EXY and the light receiving element DXY.

Referring to FIG. 1, a light emitting element E14 (for transmitting optical signals from the first layer to the fourth layer) on the optical signal transmission substrate 11 is opposed to a light receiving element D14 (for receiving the optical signals from the first layer to the fourth layer) on the optical signal transmission substrate 14. The optical signal transmission substrates 12 and 13 interposed between these elements have transmittable windows T at the positions where the optical axis passes. Likewise, a light emitting element E51 on the optical signal transmission substrate 15 is opposed to a light receiving element D51 on the optical signal transmission substrate 11. The optical signal transmission substrates 12 through 14 interposed between the substrates 11 and 15 have transmittable windows T at the positions where the optical axis crosses the substrate faces.

According to this invention, it is desirable that plural sets of the light emitting elements and the light receiving elements for transmitting the optical signal are placed along the optical axis, of one optical signal. This is because such arrangement enables high-density communication. This is about the case where a plurality of channels exists in the same row and column in the optical signal transmission areas 100. In FIG. 1, a set of a light emitting element E21 on the optical signal transmission substrate 12 and a light receiving element D21 on the optical signal transmission substrate 11 and a set of light emitting element E35 on the optical signal transmission substrate 13 and a light receiving element D35 on the optical signal transmission substrate 15 are located on the same optical axis, that is, at the same address in the optical signal transmission areas 100.

As shown in FIG. 2, the individual optical signal transmission substrate 1 which composes the optical signal transmission device is structured by comprising the optical signal transmission area 100 at a part of a circuit area 110. In the optical signal transmission area 100, at least one of a light emitting element EXY for sending optical signals to other optical signal transmission substrates and a light receiving element DXY for receiving optical signals from other optical signal transmission substrates is located so that the optical signals in a direction substantially perpendicular to the substrate surfaces can be sent or received. Moreover, when the optical signal transmission substrate is used as it is interposed between other substrates, such as interposed optical signal transmission substrate is structured in such a manner that a transmittable window T which exhibits light transmittability exists in the optical signal transmission area 100 at the position where the optical signal passes which is transmitted between other optical signal transmission substrates.

There is no limitation to the material or thickness of the optical signal transmission substrate 1. However, when the substrates are laminated, it is desirable that, for example, a bank or a spacer be provided around the substrate so that electron elements provided on the substrate will not contact other substrates. There is also no limitation to the form of a circuit in the circuit area 110 or the method of forming the circuit. However, it is necessary to locate parts of the circuit so that they will not be set beyond the parts maximum height as defined by the bank or the spacer. Specifically speaking, any circuit can be applied, such as processor circuits or memory circuits of electronic computers, or integrated circuits of TFT devices. The light emitting element EXY is the element capable of converting electric signals such as electric currents or voltages into optical signals, and any light emitting element can be applied, such as semiconductor laser (laser diodes), light emitting diodes, or organic electroluminescent (EL) elements. The light receiving element DXY is the element capable of converting the received optical signals into electric signals such as voltages or electric currents, and photoelectric conversion elements such as phototransistors or photodiodes can be used.

The optical signal transmission area 100 is the area where the light emitting element EXY, the light receiving element DXY, and the transmittable window T can be located orderly. For example, the optical signal transmission area 100 is divided into lattice sections and the light emitting element EXY, the light receiving element DXY, and the transmittable window T are located according to the lattice sections. The optical signal transmission area 100 may be composed of materials having such strength as to allow the placement of the light emitting element EXY and the light receiving element DXY at any positions.

For example, it is possible to form the optical signal transmission area 100 with a layer made of transparent resin. If the light emitting element and the light receiving element are located by using the transparent resin as a basic material, the portion of the, optical signal transmission area 100 excluding the elements exhibits light transmittability. Therefore, it is no longer necessary to actively provide the transmittable window T.

If the optical signal transmission area 100 is formed with a material which is not light transmittable, for example, the same material as that of the circuit area 110, an opening is made at the position corresponding to that of the transmittable window T, or a window capable of transmitting light is formed with resin or glass.

The number of lattice sections of the optical signal transmission area 100 (or the maximum channel number) is determined according to the number of signal channels necessary between substrates. The optical signal transmission area 100 may be located in any area on the substrate and in any shape such as a linear or circular shape other than a rectangular shape. Moreover, the optical signal transmission area 100 may be dispersed in dots which are located at separate positions within the circuit area 110 where other circuits also exist. The area of the optical signal transmission area is set at a reasonable value in order not to reduce the area of the circuit area 110 more than necessary.

Figure 3:
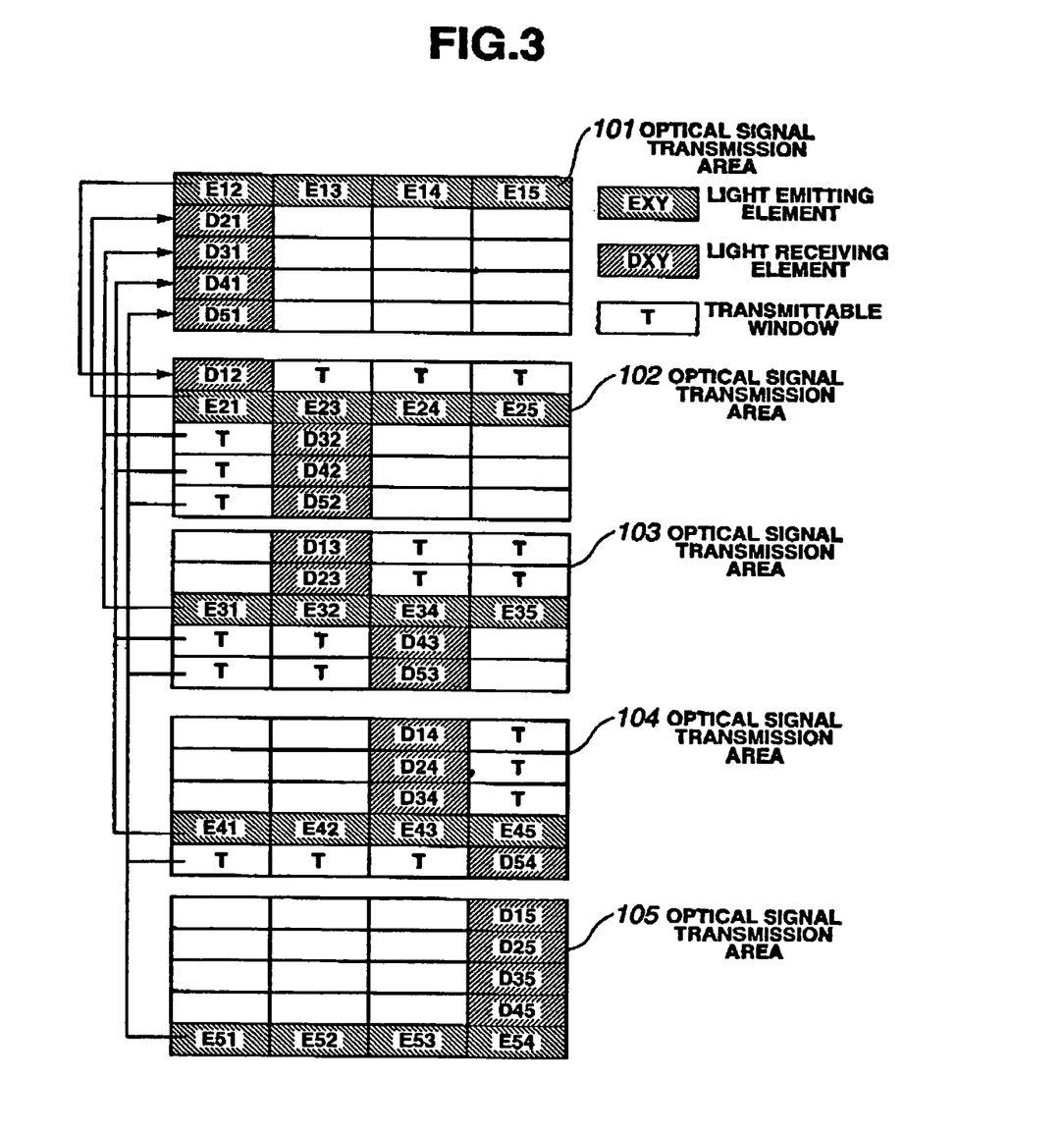
FIG. 3 is a descriptive drawing of combinations of light emitting elements and light receiving elements according to Embodiment 1.

FIG. 3 shows an example arrangement of the light emitting elements EXY, the light receiving elements DXY, and the transmittable windows T when the optical signal transmission area 100 is composed of 20 channels in total as defined by lattice sections of five rows by four columns. The area which does not correspond to any of the light emitting element EXY, the light receiving element DXY, or the transmittable window T may be either light transmittable or not transmittable. Optical signal transmission areas corresponding to the optical signal transmission substrates 11 through 15 from the first layer to the fifth layer are respectively given the reference numerals 101 through 105. Arrows indicate the transmission paths of optical signals in the leftmost column in the drawing. In this drawing, it is assumed that the light emitting from the light emitting elements EXY has the ideal property of travelling in a straight line and, therefore, the light receiving elements DXY are located adjacent to the light emitting elements EXY. However, when light emitting elements having a poor capability of emitting light in straight lines are used, it is necessary to prevent the generation of crosstalks by locating the light emitting elements and the light receiving elements at positions not adjacent to each other or by providing a layer, which functions as a clad, at the boundaries of the respective, optical signal transmission areas.

It is possible to apply various kinds of methods for manufacturing the above-described optical signal transmission substrates.

For example, a removable layer which will produce abrasion by means of a laser beam is formed on a transparent substrate made of, for example, glass and the optical signal transmission substrate of this invention is then formed in a given pattern over the removable layer. Subsequently, this optical signal transmission substrate is attached to another optical signal transmission substrate with an adhesive agent, and the removable layer is then irradiated with light from the transparent substrate side, thereby causing the transparent substrate to be removed. These steps are repeated by the number of laminations of the optical signal transmission substrates.

Alternatively, the above-described optical signal transmission substrate is formed through the intermediary of the removable layer over a plurality of transparent substrates, and two such optical signal transmission substrates are then pasted together. Subsequently, these substrates are irradiated with a laser beam from at least one transparent substrate side, thereby causing the transparent substrates to be removed at the removable layer. Another optical signal transmission substrate formed over other transparent substrates is then attached to the surface where the transparent substrates have been removed, and the laser beam is applied to such transparent substrate side, thereby removing the transparent substrates. These steps are repeated by the number of laminations of the optical signal transmission substrates.

By the above-described manufacturing methods, it is possible to laminate a multiplicity of very thin optical signal transmission substrates with certainty. However, the manufacturing methods are not limited to those described above.

According to Embodiment 1, the optical signal transmission area for sending or receiving optical signals in a direction substantially perpendicular to the substrate surface is provided at a part of the substrate. Accordingly, it is possible to provide an easy method of sending and receiving signals between substrates simply by laminating the substrates where the arrangement of the light emitting elements and the light receiving elements is made properly.

Since Embodiment 1 does not employ conductivity, neither a signal delay due to the capacity for wiring or the wiring resistance nor heat generation due to the wiring resistance will occur.

According to Embodiment 1, it is unnecessary to connect the substrates with optical fibers and, therefore, it is possible to reduce the labor required for the connecting work and the cost for the optical fibers.

Since Embodiment 1 can easily realize multiple channels for the signal transmission between the adjacent multilayered substrates, it is the most suitable signal transmission method for high-density and high-speed electronic computers or devices using TFT's.

Since Embodiment 1 employs the sending and reception of optical signals, it is possible to provide a transmission device which has high noise immunity and which will not generate unwanted emission.

(Embodiment 2)

Embodiment 2 of this invention relates to an optical signal transmission substrate, which is the substrate of Embodiment 1 additionally provided with power supply electrodes and earth electrodes, and to a device thereof.

Figure 4:
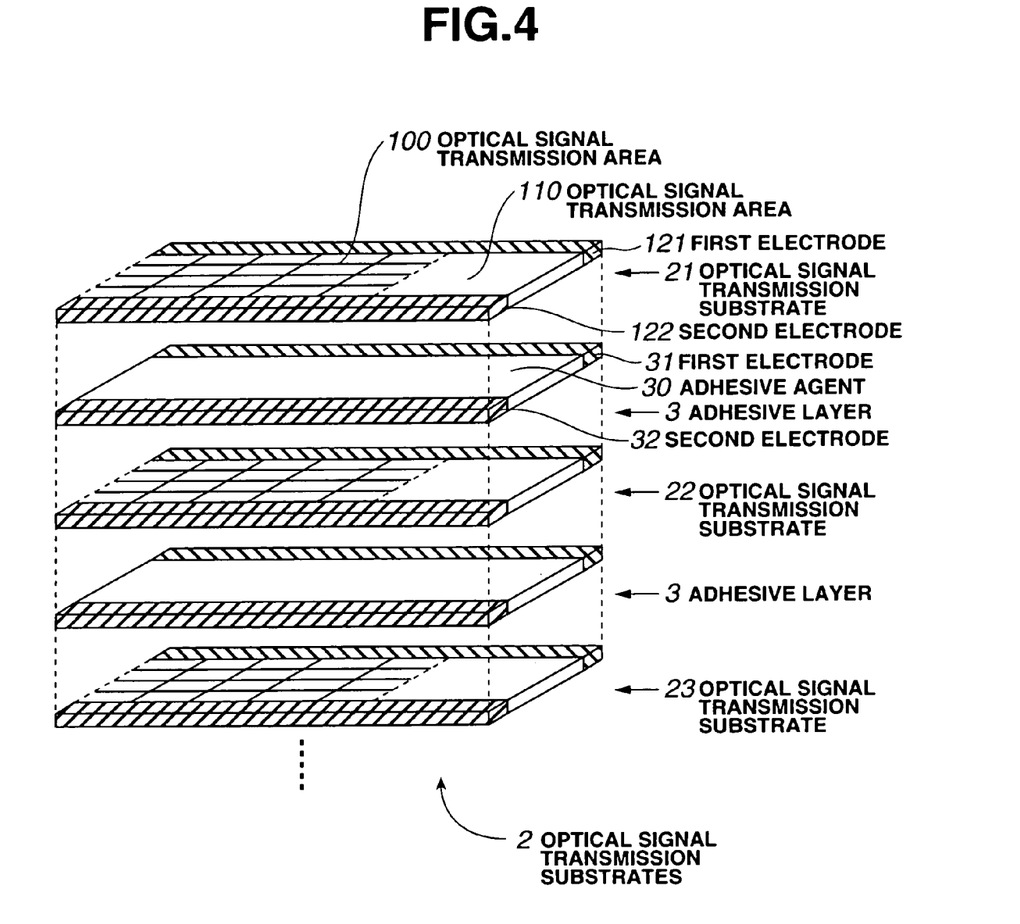
FIG. 4 is a perspective view illustrative of the construction of an optical signal transmission device according to Embodiment 2.
Figure 5:
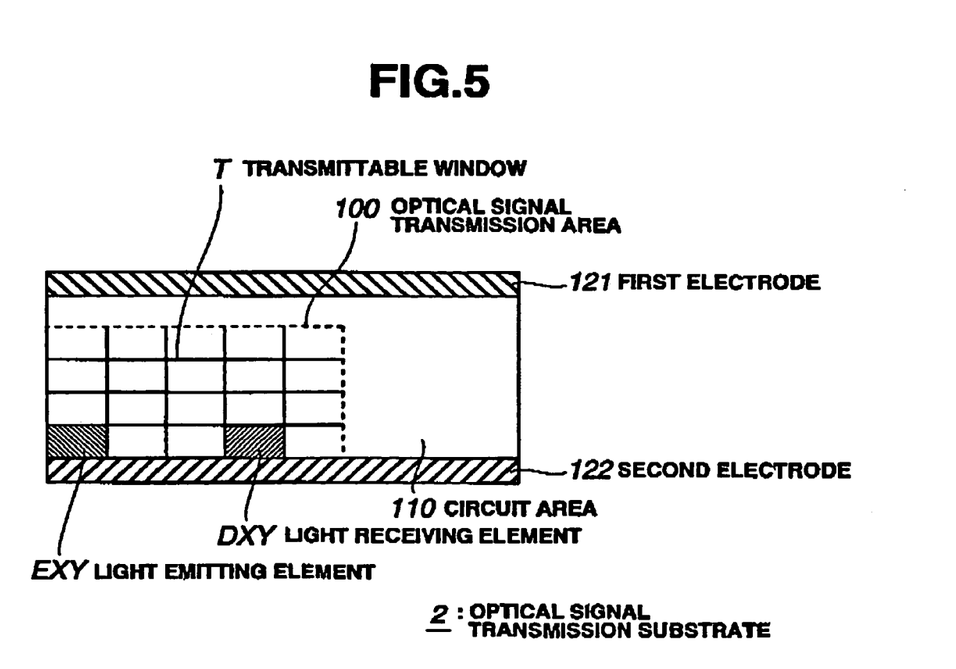
FIG. 5 is a plan view of an optical signal transmission substrate according to Embodiment 2.

FIG. 4 is a perspective view illustrative of the construction of an optical signal transmission device according to Embodiments 2. FIG. 5 is a plan view of an optical signal transmission substrate according to Embodiment 2.

As shown in FIG. 4, the optical signal transmission device according to Embodiment 2 is composed by laminating a plurality of optical signal transmission substrates 2 in such a manner that optical signal transmission areas 100 of the respective substrates overlap one another when shown on a plan view. This optical signal transmission device is different from that of Embodiment 1 in that it has adhesive layers 3 between the substrates. FIG. 4 illustrates the lamination structure of three layers in order to simplify the explanation. However, there is no limitation to the number of laminations. In FIG. 4, the respective optical signal transmission substrates 2 from the first layer to the third layer are given the reference numerals 21 through 23.

An adhesive layer 3 is composed by bonding a first electrode 31 and a second electrode 32, which are opposed to each other, and the substrate 2 with an adhesive agent 30 and by letting the adhesive agent 30 set. Examples of the adhesive agent 30 include any kinds of resins, for example, adhesives of various setting types which include reactive setting adhesives, thermosetting adhesives, optical setting adhesives such as ultraviolet ray setting adhesives, and anaerobic setting adhesives. As for compositions of such adhesives, any kinds of adhesives such as epoxy type, acrylate type, or silicon type can be applied. For the first electrode 31 and the second electrode 32, any kinds of metals such as aluminum, copper, or gold can be used. The adhesives layer 3 is formed by bonding metal bars in the shape corresponding to the first electrode 31 and the second electrode 32 with the adhesive agent, which is then made to set.

As shown in FIG. 5, each optical signal transmission substrate 2 which composes this optical signal transmission device comprises a circuit area 110 and an optical signal transmission area 100 similar to those of Embodiment 1. However, the optical signal transmission substrate 2 of Embodiment 2 is different from that of Embodiment 1 in that it comprises a first electrode 121 and a second electrode 122 at least at a pair of the edges of the substrate. It is convenient to form the pattern of the first electrode 121 and the second electrode 122 with the same materials as wiring materials used for the circuit area 110. However, if the relevant optical signal transmission substrate is to be held between the adhesive layers 3, the electrodes need to be formed in such a manner that the substrate exhibits conductivity between the front and back sides thereof.

The arrangement and construction of the light emitting elements EXY, the light receiving elements DXY, and the transmittable windows T in the optical signal transmission areas 100 in the respective optical signal transmission substrates 21 through 23 are similar to those of Embodiment 1.

Figure 6:
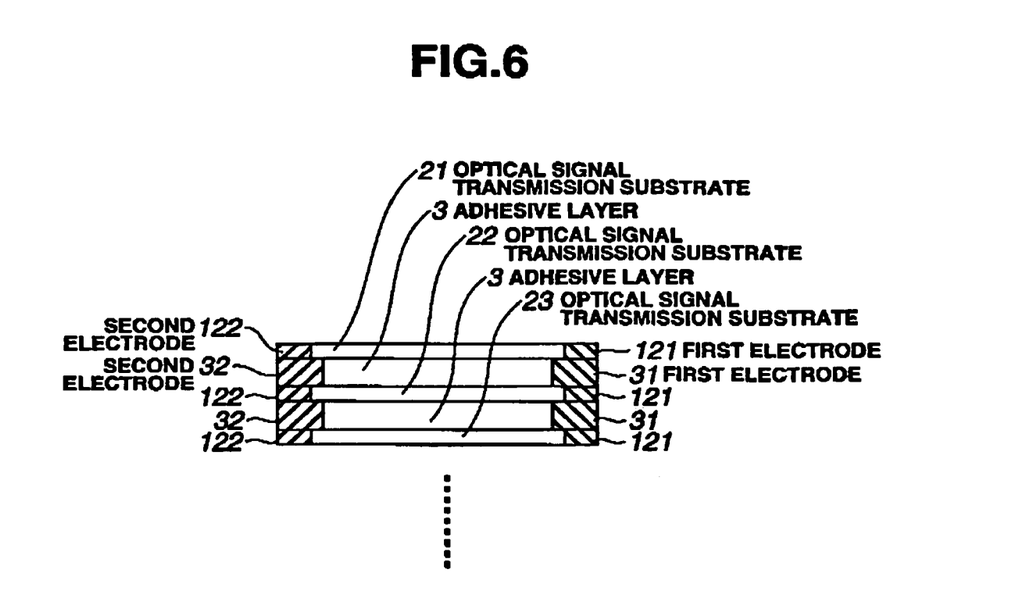
FIG. 6 is a side view of the optical signal transmission device according to Embodiment 2.

FIG. 6 shows a side view of the optical signal transmission device of Embodiment 2. It is structured in such a manner that the first electrodes 121 of the respective optical signal transmission substrates 21 through 23 are electrically in contact with the first electrodes 31 of the adhesive layers 3, and that the second electrodes 122 of the respective optical signal transmission substrates 21 through 23 are electrically in contact with the second electrodes 32 of the adhesive layer 3. The optical signal transmission device is designed to commonly wire power supply electrodes and earth electrodes by laminating the optical signal transmission electrodes 2 and the adhesive layers 3 alternately.

There are various possible methods for manufacturing the optical signal transmission device according to Embodiment 2.

If the optical signal transmission substrate 2 is sufficiently thick and is portable, it is possible to manufacture the optical signal transmission substrate by the following steps of:

(1) connecting the first electrode 31 and the second electrode 32 to the optical signal transmission substrate 2 and applying the above-described resin to the electrodes, thereby forming the adhesive layer 3;

(2) pasting another optical light transmission substrate 2 onto the above-obtained adhesive layer and then forming another adhesive layer 3 over the substrate; and (3) repeating the above-described steps a necessary number of times, thereby composing the optical signal transmission device.

If the optical signal transmission substrate 2 is very thin and is not portable by itself, it is possible to manufacture the optical signal transmission substrate by the following steps of:

(1) forming the removable layer over a base made of glass or the like;

(2) forming a circuit corresponding to the optical signal transmission substrate 2 over the removable layer;

(3) after the formation of the optical signal transmission substrate 2, forming the adhesive layer 3 thereon;

(4) irradiating the back of the base with a laser beam or the like to cause the abrasion to occur at the removable layer, thereby detaching a combination of the optical signal transmission substrate 2 and the adhesive layer 3 from the above laminated layers; and (5) laminating a necessary number of the above-mentioned combination, thereby composing the optical signal transmission device.

The abrasion at the removable layer may be caused by applying the laser beam before the formation of the adhesive layer 3 and by exerting forces after the formation of the adhesive layer 3.

Embodiment 2 can achieve the effects similar to those of Embodiment 1. Moreover, since the substrates are commonly provided with the electrodes, the connection with power sources or earth terminals is easy.

According to Embodiment 2, the substrates are pasted together with the adhesive layers and, therefore, it is easy to form the multilayered structure and it is possible to provide a strong optical signal transmission device.

(Embodiment 3)

Embodiment 3 of this invention relates to a variation example of the optical signed transmission substrate according to Embodiment 2.

Figure 7:
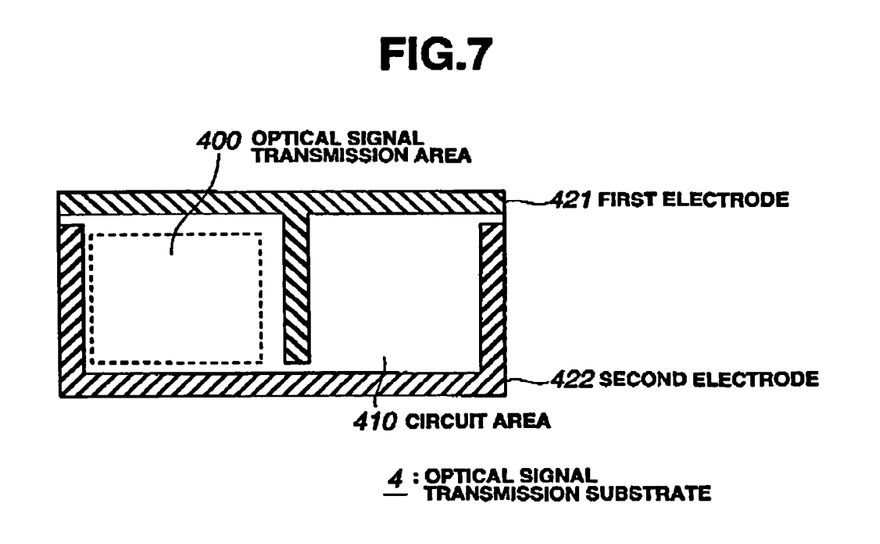
FIG. 7 is a plan view of an optical signal transmission substrate according to Embodiment 3.

FIG. 7 shows a plan view of an optical signal transmission substrate according to Embodiment 3. As shown in FIG. 7, an optical signal transmission substrate 4 according to Embodiment 3 is formed in a complicated pattern where a first electrode 421 and a second electrode 422 extend toward an optical signal transmission area 400 and a circuit area 410. This electrode pattern is formed by patterning the electrodes of the optical signal transmission substrate 4 in the shape required for the optical signal transmission area 400 and the circuit area 410 and by applying a normally used method of forming a wiring pattern.

As for the construction of an optical signal transmission device which uses this optical signal transmission substrate 4, light emitting elements EXY and light receiving elements DXY may be located in the manner similar to those of Embodiments 1 and 2. It is also possible to use the adhesive layers 3 of Embodiment 2 for the attachment of the substrates.

Embodiment 3 can achieve the effects similar to those of Embodiment 1. Moreover, since the patterning is employed for the electrodes of the substrates, it is easy to connect the circuit elements with power source electrodes and earth electrodes and it is also effective as a means of preventing unwanted emission.

(EXAMPLE)

Figure 8:
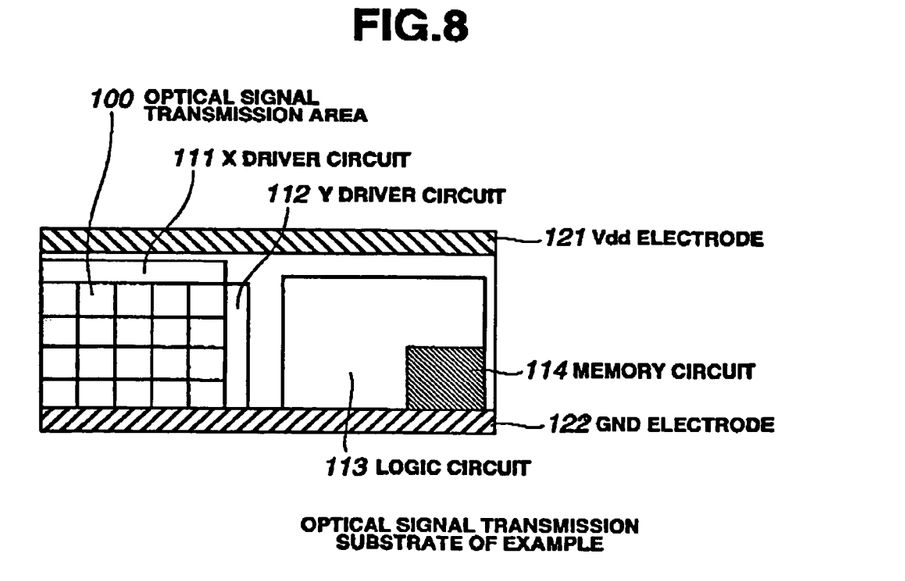
FIG. 8 is a plan view of an optical signal transmission substrate of Example.

As an example of Embodiment 2, a simulation of an optical signal transmission substrate as shown in the plan view of FIG. 8 was performed. The first electrode 121 was used as a power source (Vdd) electrode and the second electrode 122 was used as an earth (GND) electrode. An X driver circuit 111 for supplying power in the row direction (X-axis direction) of the optical signal transmission area 100 and a Y driver circuit 112 for selecting the column direction (Y-axis direction) of the optical signal transmission area 100 were provided. The circuit area was provided with a logic circuit 113 which comprises a memory circuit 114. As the logic circuits, TFT's were integrated. The specification of this Example is as follows:

- Number of substrate laminations: 1,000 sheets
- Thickness of the substrate and the adhesive layer: Approximately 10 μm/set
- Number of addresses (i.e., number of lattice sections): 1000 sheets×approximately $10^6$ (integrated number per substrate)
- Area of the address: $50×50 \ \mu m^2 = 2.5×10^3 \ \mu m^2$
- Area of the optical signal transmission area: area of the address×integrated number=25 cm²
- Outer dimensions of the optical signal transmission substrate:
- 7 cm (length)×14 cm (width)=98 cm²
- Manufacturing cost per area: ¥20/cm²
- Manufacturing cost per substrate: ¥2,000
- Manufacturing cost of the device: ¥2,000,000
- Area of TFT: 4 μm²
- Number of TFT's per substrate: approximately $9×10^8$=1G pieces (Other Variations)

This invention can be applied in many variations without limitation to the above-described embodiments. For example, the outlines of the optical signal transmission substrate, the optical signal transmission area, and the electrodes, as well as the arrangement of the optical signal transmission area are merely examples.

Figure 9:
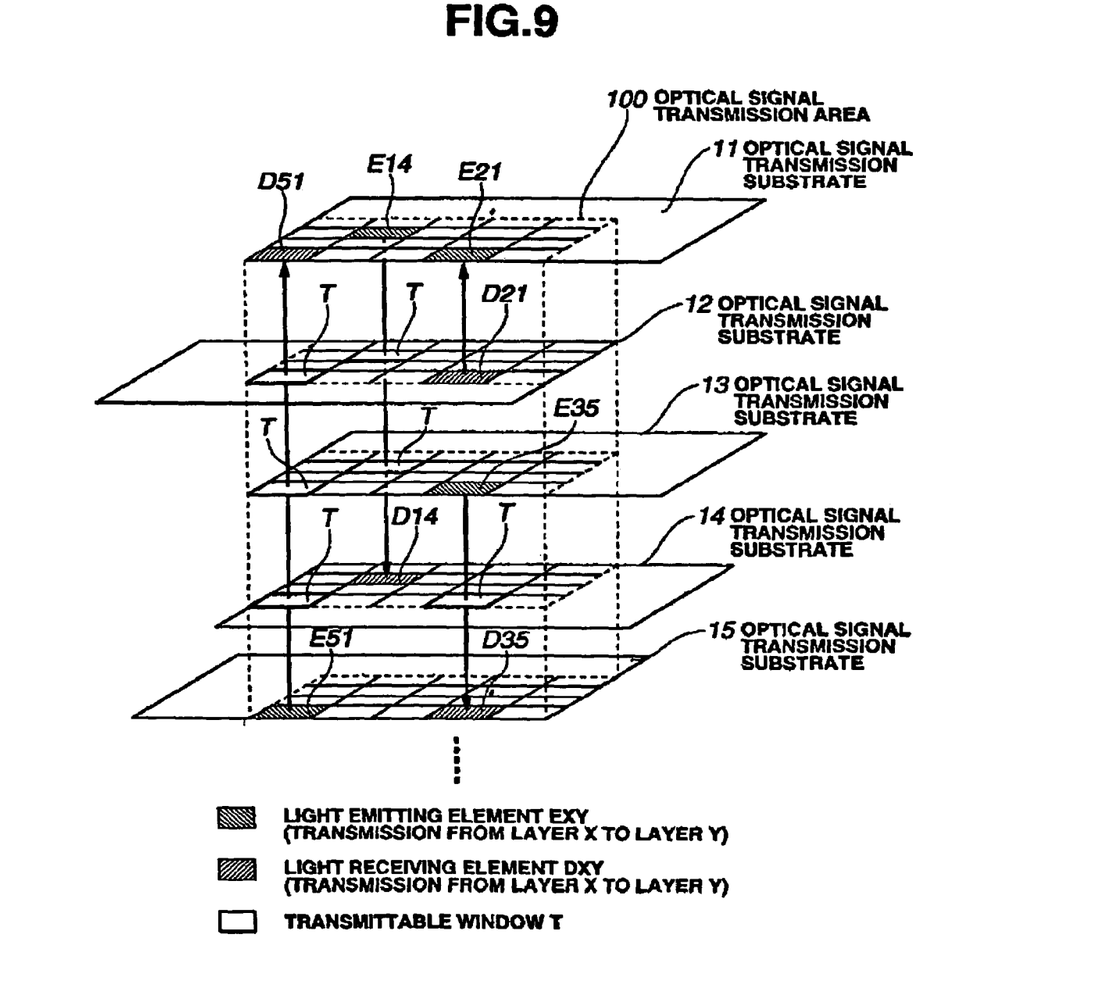
FIG. 9 is a variation of a lamination method for the optical signal transmission device.

Regarding the optical signal transmission device, when the optical signal transmission substrates are placed one over another in parallel with the surface perpendicular to the optical axis of optical signals, the optical signal transmission areas should only overlap one another so as to make the respective addresses correspond to one another, and the substrates themselves should not necessarily overlap in their entirety. For example, as shown in FIG. 9, even if the arrangement of the optical signal transmission area is different in each substrate, the signal transmission is possible as long as the optical signal transmission areas rightly overlap one another.

INDUSTRIAL APPLICABILITY

In this invention, the substrates to be laminated are provided with the optical signal transmission areas and also with sets of the light emitting elements and the light receiving elements for enabling the transmission of optical signals between the substrates. Accordingly, it is possible to eliminate the man-hours required for the wiring work and the costs for wiring. Such a construction enables high-density packaging and high-speed communications.

What is claimed is:

1. An optical signal transmission device comprising:

a plurality of optical signal transmission substrates, each of the plurality of optical signal transmission substrates including a plurality of first electrodes and a plurality of optical signal transmission areas where at least one of a light emitting element for sending an optical signal to one of the plurality of optical signal transmission substrates or a light receiving element for receiving an optical signal from one of the plurality of optical signal transmission substrates is located so as to be capable of sending or receiving the optical signal in a direction substantially perpendicular to a surface of the plurality of optical signal transmission substrates; and an adhesive layer formed between the plurality of optical signal transmission substrates, the adhesive layer including a plurality of second electrodes and an adhesive agent for electrically connecting one of the plurality of optical signal transmission substrates with another of the plurality of optical signal transmission substrates, the plurality of second electrodes being in contact with the plurality of first electrodes;

wherein an optical signal transmission member formed by the plurality of optical signal transmission substrates being laminated in such a manner that at least one of the plurality of optical signal transmission areas of one of the plurality of optical signal transmission substrates overlaps the plurality of optical signal transmission areas of another of the plurality of optical signal substrates, and wherein the light receiving element is located in at least one of the plurality of optical signal transmission substrates so as to be opposite the light emitting element provided in at least one of the other optical signal transmission substrates.

2. The optical signal transmission device according to claim 1, one of the plurality of optical signal transmission substrates having a transmittable window exhibiting light transmittability at the position where the optical signal to be transmitted between the light emitting element and the light receiving element passes through.

3. The optical signal transmission device according to claim 1, the light emitting element and the light receiving element being located along an optical axis of at least one of the optical signal.

4. The optical signal transmission device according to claim 1, at least one of the plurality of optical signal transmission areas having a transparent material.

5. The optical signal transmission device according to claim 1, clads being provided at boundaries of the plurality of optical signal transmission areas.

6. The optical signal transmission device according to claim 1, the plurality of optical signal transmission areas being divided into lattice sections and the light emitting element or the light receiving element being located in at least one of the lattice sections.

* * * * *